(12) United States Patent
Nicolosi

(10) Patent No.: US 7,042,713 B2
(45) Date of Patent: May 9, 2006

(54) SLIDE CASE WITH PIVOTABLE STAND MEMBER FOR HANDHELD COMPUTING DEVICE

(75) Inventor: Matthew Thomas Nicolosi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 108 days.

(21) Appl. No.: 10/936,842

(22) Filed: Sep. 7, 2004

(65) Prior Publication Data

US 2005/0264988 A1 Dec. 1, 2005

Related U.S. Application Data

(60) Provisional application No. 60/575,637, filed on May 26, 2004.

(51) Int. Cl.
*G06F 1/16* (2006.01)
(52) U.S. Cl. ....................... 361/681; 361/683
(58) Field of Classification Search ................ 361/681, 361/683
See application file for complete search history.

(56) References Cited

U.S. PATENT DOCUMENTS 4,113,212 A * 9/1978 Coriden ...................... 248/455
5,530,234 A * 6/1996 Loh et al. .................. 235/61 R
5,682,182 A * 10/1997 Tsubosaka ................... 345/173

* cited by examiner

*Primary Examiner*—Yean-Hsi Chang
(74) *Attorney, Agent, or Firm*—J. Dennis Moore; W. James Brady, III; Frederick J. Telecky, Jr.

(57) ABSTRACT

A handheld computing device includes a display screen, a main housing portion, a removable case, and a stand member. The main housing retains the display screen. The removable case is adapted to slidably fit over at least part of the main housing. The stand member is pivotably coupled to the case. The stand member, the case, and the main housing are configured so that the main housing may be retained at a tilt angle relative to a surface by the stand member and the case when the case is laying on the surface and when the stand member is pivoted relative to the case to form a stand angle between the stand member and the case. Preferably, the handheld computing device is a system adapted to have a storage configuration, a laying usage configuration, and a tilted usage configuration. The handheld computing device may be a graphing calculator, for example.

20 Claims, 9 Drawing Sheets

SLIDE CASE WITH PIVOTABLE STAND MEMBER FOR HANDHELD COMPUTING DEVICE

This application claims the priority benefit of commonly owned U.S. Provisional Patent Application having Ser. No. 60/575,637 entitled GRAPHING HANDHELD KICK-STAND SLIDE CASE filed on May 26, 2004, which is hereby incorporated by reference.

TECHNICAL FIELD

The present invention generally relates to housings, cases, and mechanical assemblies for a handheld computing device. In one aspect it relates more particularly to a slide case having a pivotable stand member adapted for use with a handheld computing device.

BACKGROUND

Handheld computing devices have become a commonly used tool in education, business, engineering, and field services. In the context of education, for example, handheld computing devices are beginning to be integrated into many teaching programs. Many schools now allow and encourage students in math classes to use graphing calculators to aid students in learning about advanced math topics, such as trigonometry and calculus.

Examples of handheld computing devices include, but are not necessarily limited to: graphical calculators, calculators with a multi-line screen, scientific calculators, advance calculators able to upload and run software applications, handheld-size limited-purpose computer devices, handheld-sized educational computer devices, handheld-sized portable computer device having a multi-line screen, portable computer devices having a video screen, personal digital assistants (PDA), palmtop computers, handheld computing devices with a touch screen interface, personal communicators, personal intelligent communicators, cellular or mobile telephones having a multi-line screen, global positioning system (GPS) devices, portable inventory logging computer devices having a multi-line screen (as may be used by courier deliverers, for example), handheld monitoring devices having a multi-line screen (as may be used by meter readers, for example), handheld parking ticket administering devices having a multi-line screen, handheld portable email computer devices having a multi-line screen, handheld portable Internet browsing devices, handheld portable gaming devices, and any combination thereof, for example.

Most graphing calculators have simple LCD screens to reduce the battery usage and to keep the price of the calculators affordable for students. However, such LCD screens often require the user to hold the calculator at a certain titled angle or to lean over a calculator laying flat on a desk to view the information on the screen. Also, a glare caused by overhead lights as a calculator lays flat on a desk or work surface can make it difficult to read an LCD screen. These factors often cause the user to hold the device in one hand or to repeatedly lean over the device as it lays on a flat surface. Repeatedly leaning over the device can get tiresome, especially during frequent use of the device, and may cause a poor posture during use of the device. Hence, it would be desirable to make the device more comfortable and ergonomic to use while reducing the tendency to cause a user to sit or work using a poor posture.

Furthermore, during use of a handheld computing device, it is often desirable to have both hands free without having to repeatedly pick up and set down the device during repeated use. For example, it may be desirable to use a keyboard (for the device or for another device, like a personal computer) while using the handheld computing device. Or as another example, a user may be holding a telephone with one hand while trying to use the device. Also if the user is attempting to write with a pen or pencil (e.g., taking a test, taking notes in class, working) while also needing to use the device, it would be preferred to not have to repeatedly pick up the device each time or lean over the device. Hence, there is a need for a way to hold and retain a comfortable viewing position for a handheld computing device to enhance the ease, speed, and ergonomics of using the device.

SUMMARY OF THE INVENTION

The problems and needs outlined above may be addressed by embodiments of the present invention. In accordance with one aspect of the present invention, a handheld computing device is provided, which includes a display screen, a main housing portion, a removable case, and a stand member. The main housing portion retains the display screen. The removable case is adapted to slidably fit over at least part of the main housing portion. The stand member is pivotably coupled to the case. The stand member, the case, and the main housing portion are configured so that the main housing portion may be retained at a tilt angle relative to a surface by the stand member and the case when the case is laying on the surface and when the stand member is pivoted relative to the case to form a stand angle between the stand member and the case. The stand member may be removably coupled to the case. The case may have at least two stand attachment locations such that the stand member may be pivotable coupled to the case at any of the stand attachment locations. The main housing portion may include at least one slot adapted to accept a portion of the stand member therein and located on a back side of the main housing portion. The handheld computing device may be a graphing calculator, for example. The main housing portion may further retain a keypad, a processor, and batteries. The case and the stand member may be made from plastic, for example.

In accordance with another aspect of the present invention, a handheld computing device system is provided. The system is adapted to have a storage configuration, a laying usage configuration, a tilted usage configuration, or any combination thereof. The system includes a display screen, a main housing portion, a removable case, and a stand member. The main housing portion has a top side and a bottom side. The main housing portion retains the display screen on the top side. The removable case is adapted to slidably attach to the main housing portion. The stand member has a distal end and an attachment end. The attachment end of the stand member is pivotably coupled to the case. In the storage configuration, the case is slidably attached to the main housing portion to cover at least part of the top side of the main housing portion, the stand member is in a pivoted closed position relative to the case, and the stand member is located between the case and the top side of the main housing portion. In the laying usage configuration, the case is slidably attached to the main housing portion to cover at least part of the bottom side of the main housing portion, the stand member is in a pivoted closed position relative to the case, and the stand member is located between the case and the bottom side of the main housing portion. In the tilted usage configuration, the stand member is in a pivoted open position relative to the case so that a stand angle is formed between the stand member and the case, the bottom side of the main housing portion rests on the distal end of the stand member, and the main housing portion is retained at a tilt angle relative to a surface by the stand member and the case when the case is laying on the surface.

The foregoing has outlined rather broadly features of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
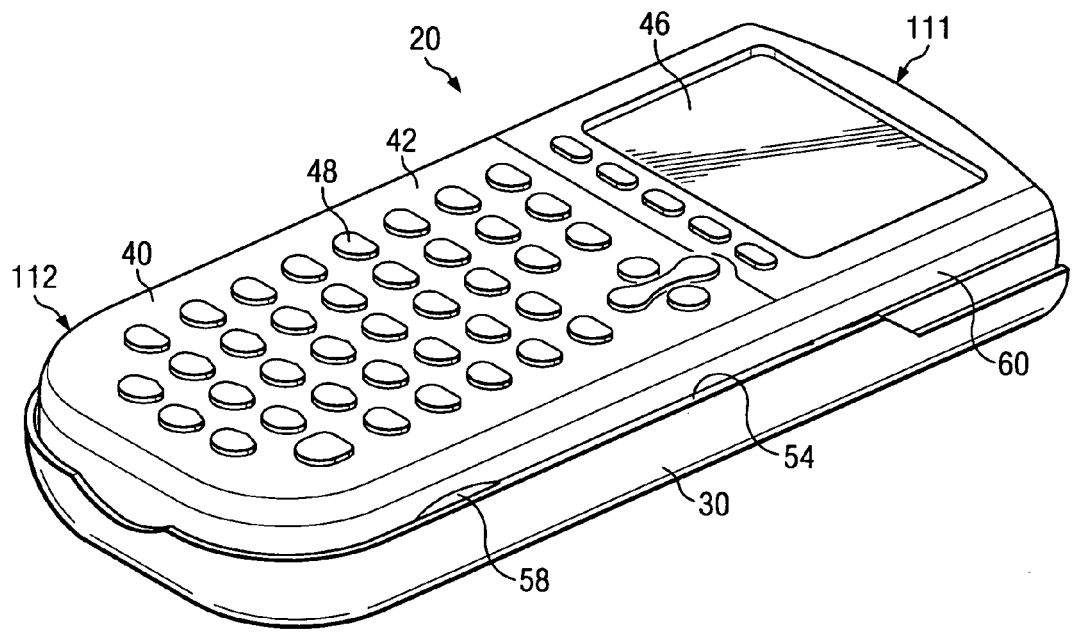
FIGS. 1 and 2 show the system of a first illustrative embodiment in a laying usage configuration.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Generally, a preferred embodiment of the present invention provides a handheld computing device system 20 adapted to have a storage configuration, a laying usage configuration, and a tilted usage configuration, by using a removable case 30 having a stand member 35 pivotably coupled thereto. FIGS. 1–12 illustrate various views and configurations for a first illustrative embodiment of the present invention. Although the first embodiment is shown and described in the context of a graphing calculator as the handheld computing device, an embodiment of the present invention may be used for other handheld computing devices and/or for other applications.

Figure 2:
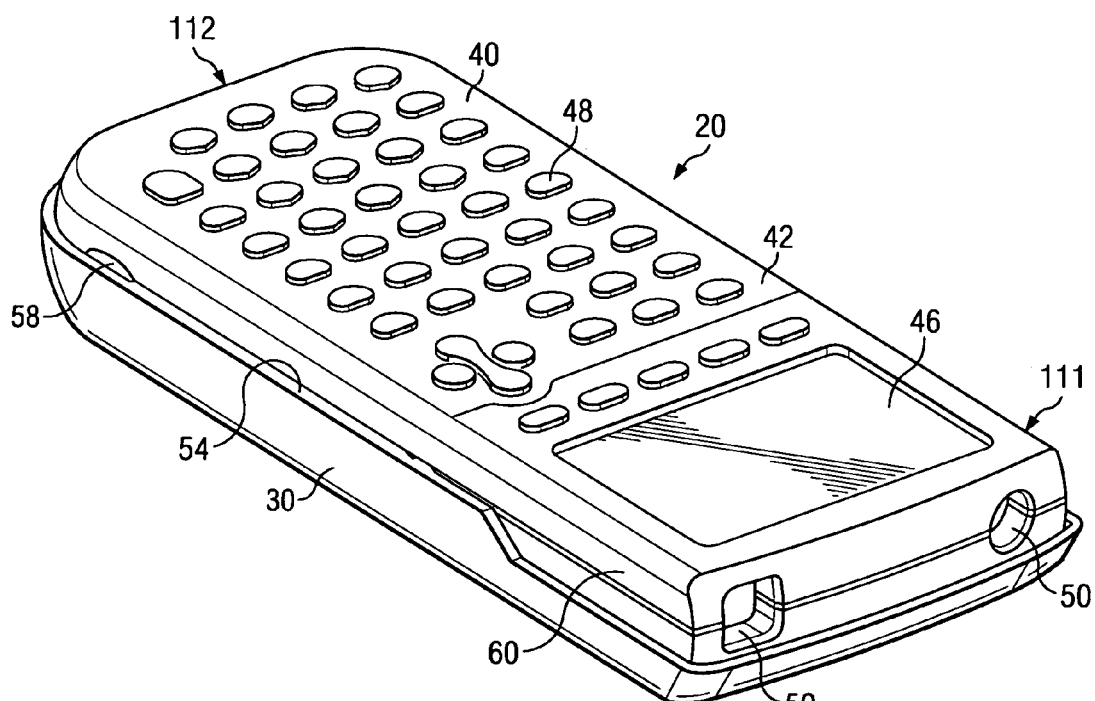
Figure 3:
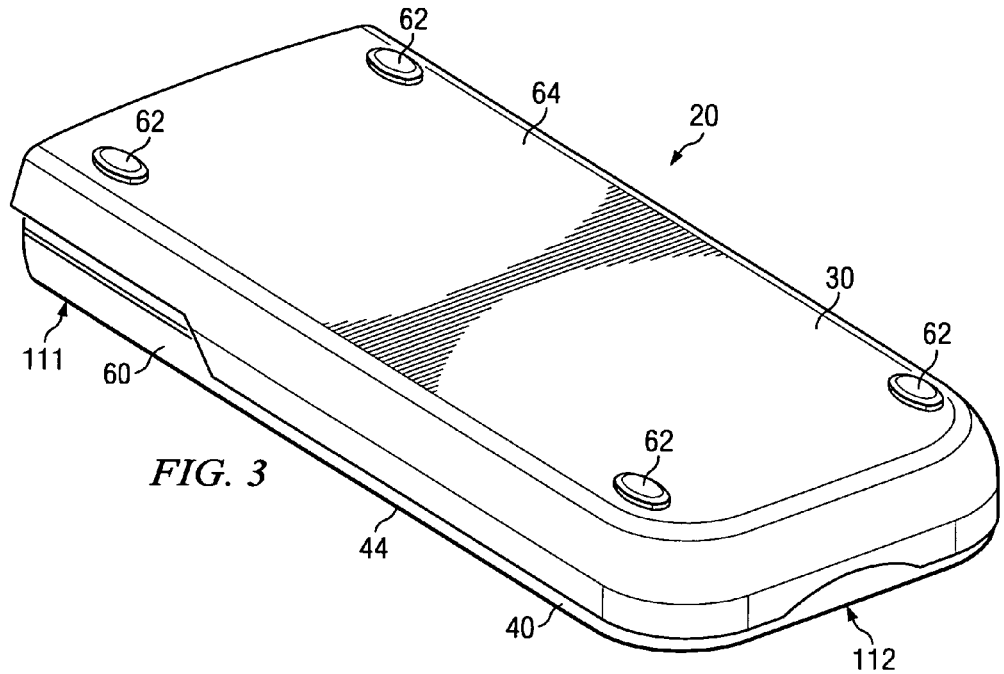
FIGS. 3 and 4 show the system of the first embodiment in a storage configuration.
Figure 4:
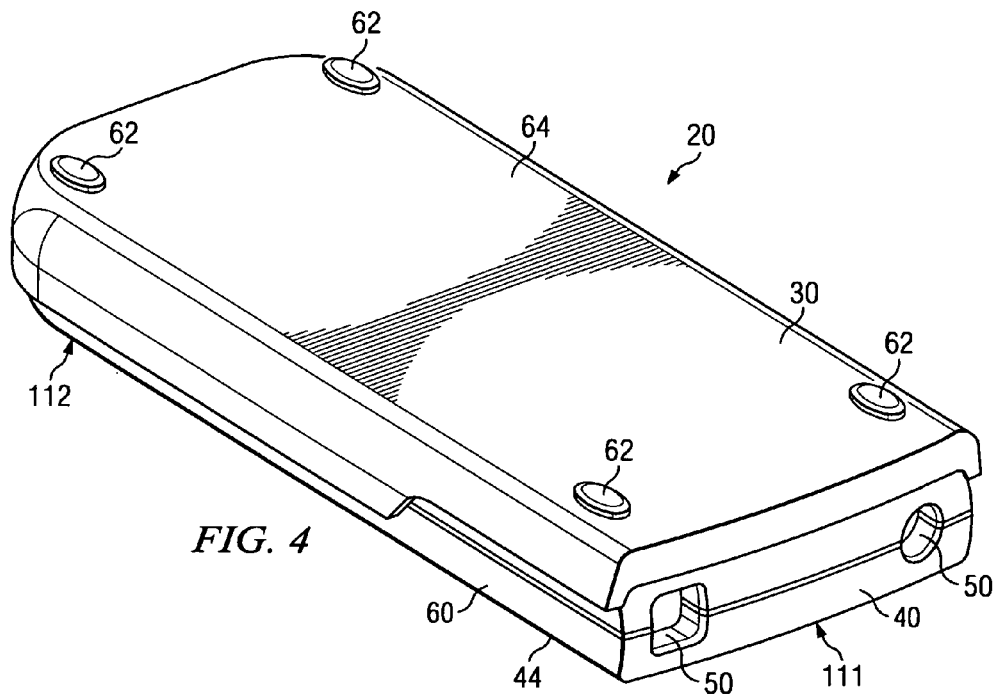

FIGS. 1 and 2 show the system 20 of the first embodiment in a laying usage configuration. FIGS. 3 and 4 show the system 20 of the first embodiment in a storage configuration. Before describing these configurations shown in FIGS. 1–4, however, some of the components of the system 20 will be described with reference to FIGS. 1–4. The system 20 has a main housing portion 40 and a removable case 30. The main housing portion 40 has a top side 42 and a bottom side 44. The main housing 40 retains a display screen 46 on the top side 42. Also, a keypad 48 is located on the top side 42 in the first embodiment. Typically, the main housing 40 will also retain circuitry, memory, a processor, and batteries (not shown). In the example graphing calculator system 20 of the first embodiment, I/O ports 50 are provided for connections to external devices (e.g., personal computer, keyboard, USB connected device) (see e.g., FIG. 2). The removable case 30 is adapted to slidably attach to the main housing 40.

For years, one of the trademark features for many of Texas Instrument's graphing and scientific calculators has been their sliding case that enables a laying usage configuration and a storage configuration. The laying usage and storage configurations of such prior devices are essentially the same as those shown for the first embodiment in FIGS. 1–4, except that the sliding case 30 for the first embodiment of the present invention may be slightly thicker (overall thickness) than that of prior devices to provide room for the stand member 35. Note that in an embodiment of the present invention, the case 30 may be adapted to slide onto the main housing 40 from the first end 111 to the second end 112 and/or from the second end 112 to the first end 111 of the main housing 40.

In the first embodiment, the slidable case 30 has two rail portions 54 extending from the inner sides 56 of the case 30, and the main housing 40 has two channels 58 on its outer sides 60 that are adapted to receive the rails 54 of the case 30 (see rails 54 and channels 58 also in FIGS. 5–12). These rails 54 and channels 58 are preferably configured so that the case 30 may be slidably attached to the main housing 40 in at least two ways.

In the storage configuration of the first embodiment (see FIGS. 3 and 4), the case 30 can be slidably attached to the main housing 40 to cover at least part of the top side 42 of the main housing 40. Thus in the first embodiment, the key pad 48 and the display screen 46 are covered and protected by the case 30 in the storage configuration. The amount of the top side 42 covered by the case 30 in a storage configuration may vary (more or less) in other embodiments of the present invention. Also, in some embodiments of the present invention, the case 30 may not be adapted to slidably attach to the main housing 40 in a way that the case 30 covers part or all of the top side 42 of the main housing 40.

As shown in FIGS. 3 and 4, the case 30 preferably has one or more non-slip feet members 62 provided on a first side 64 of the case 30. These feet members 62 help prevent the system 20 from sliding when resting on the feet members 62. The size, number, location(s), shape(s), and material(s) of the feet member(s) 62 in an embodiment may vary. Some embodiments (not shown) may not have feet members 62. In the first embodiment, the feet members 62 are oval shaped and are made of a rubber material, for example (see FIGS. 3 and 4). Also, the first side 64 of the case 30 (shown in FIGS. 3 and 4) may have logos, text, patterns, art, pictures, or combinations thereof, formed or placed thereon.

In the laying usage configuration of the first embodiment (see FIGS. 1 and 2), the case 30 can be slidably attached to the main housing 40 to cover at least part of the bottom side 44 of the main housing 40. Hence, the system 20 may be used in the laying usage configuration of the first embodiment because key pad 48 and the display screen 46 are exposed when the case 30 is attached to cover the bottom side 44.

However, as noted above, it is sometimes less comfortable to view the information provided on the display screen 46 in the laying usage configuration. As also noted above, there is a need for a way to hold and retain a comfortable viewing position for a handheld computing device 20 to enhance the ease, speed, and ergonomics of using the device 20. FIGS. 5–12 and the following description show how the first embodiment can meet this need.

Figure 5:
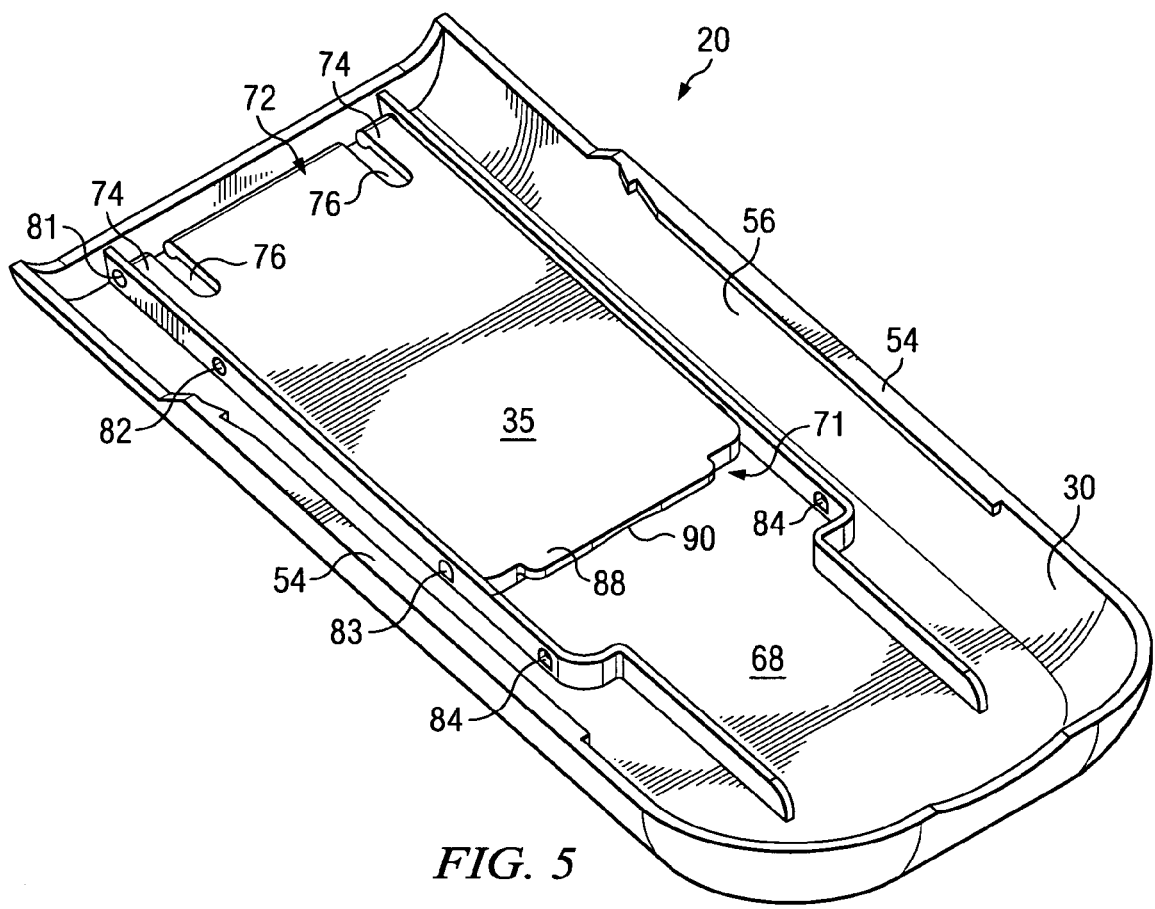
FIGS. 5 and 6 are perspective views showing a second side of the case of the first embodiment.
Figure 6:
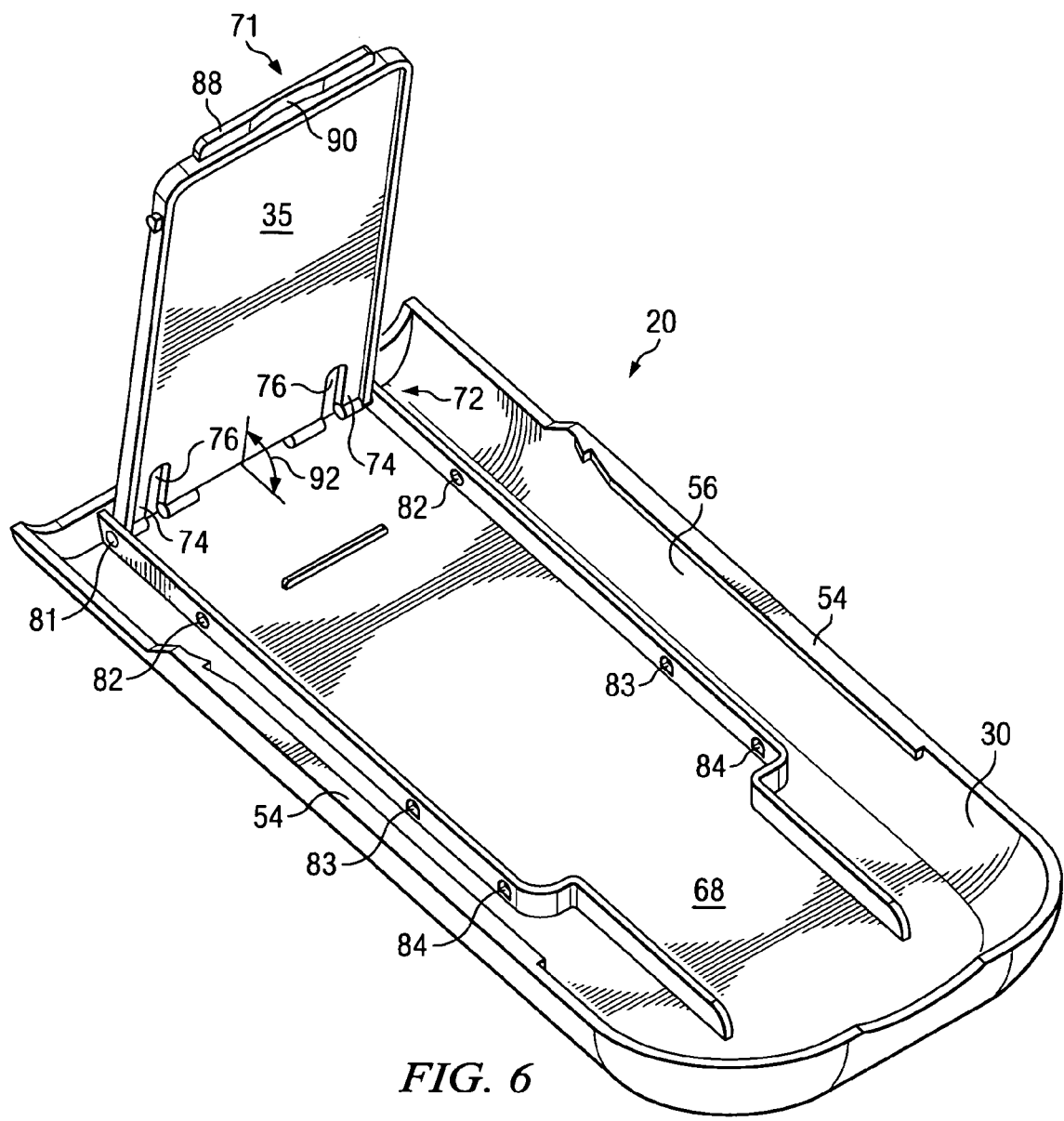

FIGS. 5 and 6 are perspective views showing a second side 68 of the case 30 of the first embodiment (removed from the main housing 40, which is not shown in FIGS. 5 and 6). In the first embodiment, a stand member 35 is pivotably coupled to the second side 68 of the case 30. The stand member 35 shown in FIGS. 5 and 6 has a distal end 71 and an attachment end 72. The attachment end 72 of the first embodiment has two tab members 74 at the attachment end 72. These tab members 74 pivotably fit within corresponding holes 81, 82 formed in the case 30. The case 30 of the first embodiment has two sets of holes 81, 82 adapted to receive the tab members 74. In FIGS. 5 and 6, the tab members 74 of the stand member 35 are located in a first set of holes 81. In the first embodiment, a second set of holes 82 (identical to the first set of holes 81) are located about an inch from the first set of holes 81, for example. The tab members 74 of the first embodiment are designed to be compliant due to the notches 76 formed in the attachment end 72 of the stand member 35 and the material used for the stand member 35. By squeezing the tab members 74 toward each other, the tab members 74 may be removed from the first set of holes 81 and placed in the second set of holes 82. Thus, the stand member 35 of the first embodiment is removably coupled to the case 30.

In other embodiments (not shown), there may be more or less sets of holes, like the first and second sets of holes 81, 82, to provide more or less attachment location options for the stand member 35. The relative positioning of the holes 81, 82 also may vary from that shown. In other embodiments (not shown), the stand member 35 may be pivotably coupled to the case 30 in different ways and/or the stand member 35 may not be removably coupled (i.e., permanently coupled). For example, a stand member 35 of another embodiment (not shown) may be pivotably coupled to the case 30 by a hinge in way that the stand member 35 is not removable. With the benefit of this disclosure, one of ordinary skill in the art may realize many other ways and design choices for pivotably coupling the stand member 35 to the case 30 without departing from the spirit and scope of the present invention.

In FIG. 5, the stand member 35 is shown in a pivoted closed position relative to the case 30. In the laying usage and storage configurations shown in FIGS. 1–4 (although not seen in these figures), the stand member 35 is in the pivoted closed position. In the laying usage configuration of FIGS. 1 and 2, the stand member 35 is located between the case 30 and the bottom side 44 of the main housing 40. In the storage configuration of FIGS. 3 and 4, the stand member 35 is located between the case 30 and the top side 42 of the main housing 40.

Referring again to FIGS. 5 and 6, the distal end 71 of the stand member 35 includes two bump members 78 extending therefrom, and the case 30 has a third and fourth set of holes 83, 84 that are designed to receive the bump members 78 therein. As shown in FIG. 5, when the tab members 74 are located in the first set of holes 81, the bump members 78 are designed to be snapped into the third set of holes 83 to retain the stand member 35 in the pivoted closed position. The fourth set of holes 84 are positioned so that the bump members 78 can be snapped into the fourth set of holes 84 when the tab members 74 are located in the second set of holes 82 and when the stand member 35 is in the pivoted closed position relative to the case 30. Thus, having the bump members 78 snapped into the third or fourth set of holes 83, 84 may keep the stand member 35 from pivoting open relative to the case 30 when changing the system 30 from/to a storage configuration to/from a laying usage configuration.

In the first embodiment, the first and second set of holes 81, 82 have a different shape than the third and fourth set of holes 83, 84, and the tab members 74 will not fit into the third or fourth set of holes 83, 84. This prevents the stand member 35 from being improperly installed. However, the holes of another embodiment (not shown) may be all the same or different from each other in various other ways. In other embodiments (not shown), there may be more or less sets of holes, like the third and fourth sets of holes 83, 84, to provide more or less location options for the bump members 78. Also, the bump members 78, the third set of holes 83, the fourth set of holes 84, and/or any other way of retaining the stand member 35 in a pivotably closed position may be omitted in other embodiments (not shown). With the benefit of this disclosure, one of ordinary skill in the art may realize many other ways and design choices for retaining the stand member 35 in a pivoted closed position relative to the case 30 without departing from the spirit and scope of the present invention.

Still referring to FIGS. 5 and 6, the distal end 71 of the stand member 35 of the first embodiment has a tongue member 88 extending therefrom. The tongue member 88 preferably has a recessed portion 90 providing space between the tongue member 88 and the case 30 when the stand member 35 is in the pivoted closed position (see FIG. 5). This recessed portion 90 of the tongue member 88 may make it easier to unsnap the bump members 78 from the holes (83 or 84) to release the stand member 35 from its pivoted closed position. In other embodiments (not shown), however, the tongue member 88 and/or the recessed portion 90 may have different shapes or may be omitted.

FIG. 6 shows the stand member 35 in a pivoted open position relative to the case 30 so that a stand angle 92 is formed between the stand member 35 and the case 30. The stand angle 92 may be varied as needed to provide different configurations, as will be described next.

Figure 7:
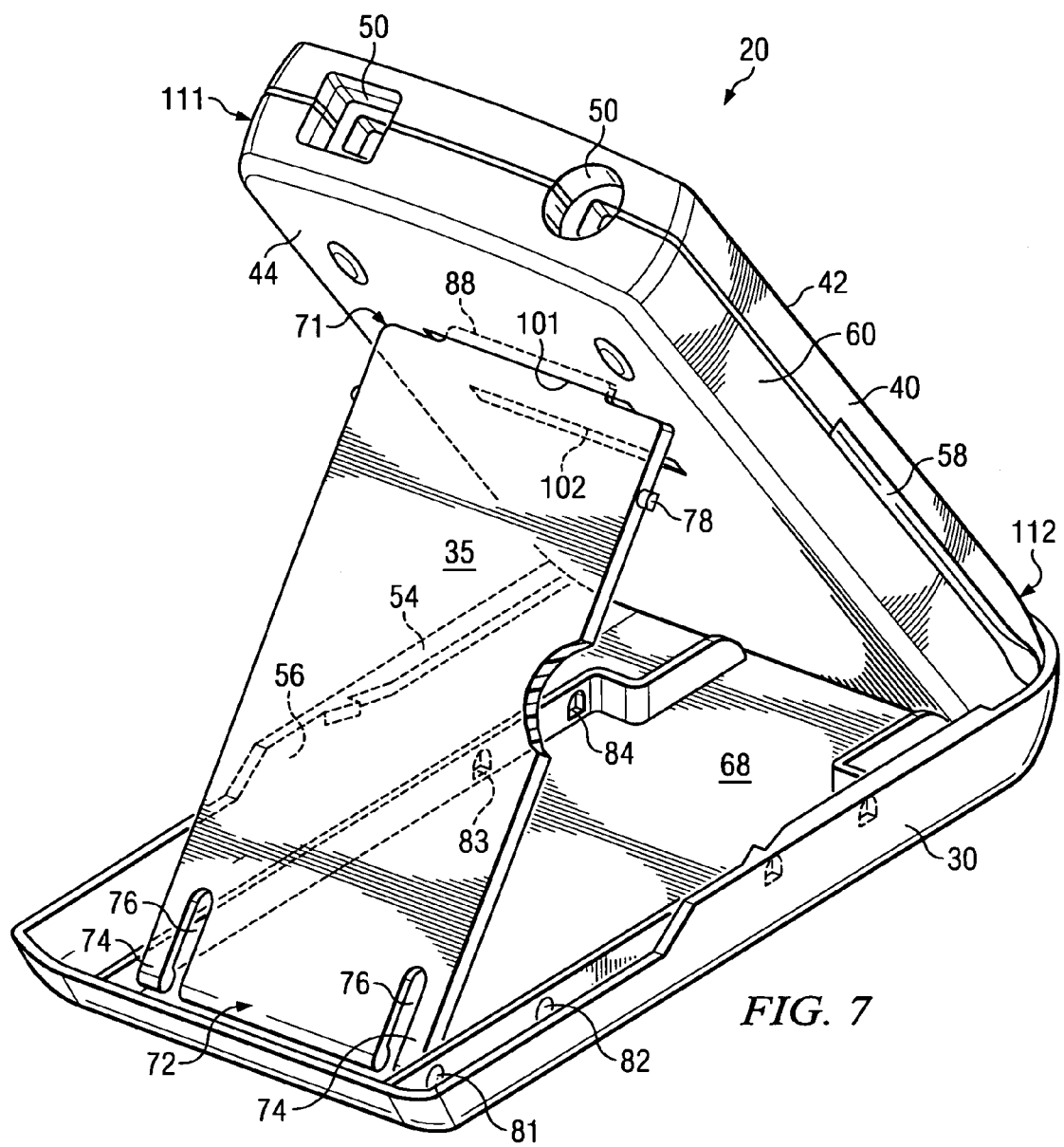
FIGS. 7–12 show variations of a tilted usage configuration for the system of the first embodiment.
Figure 8:
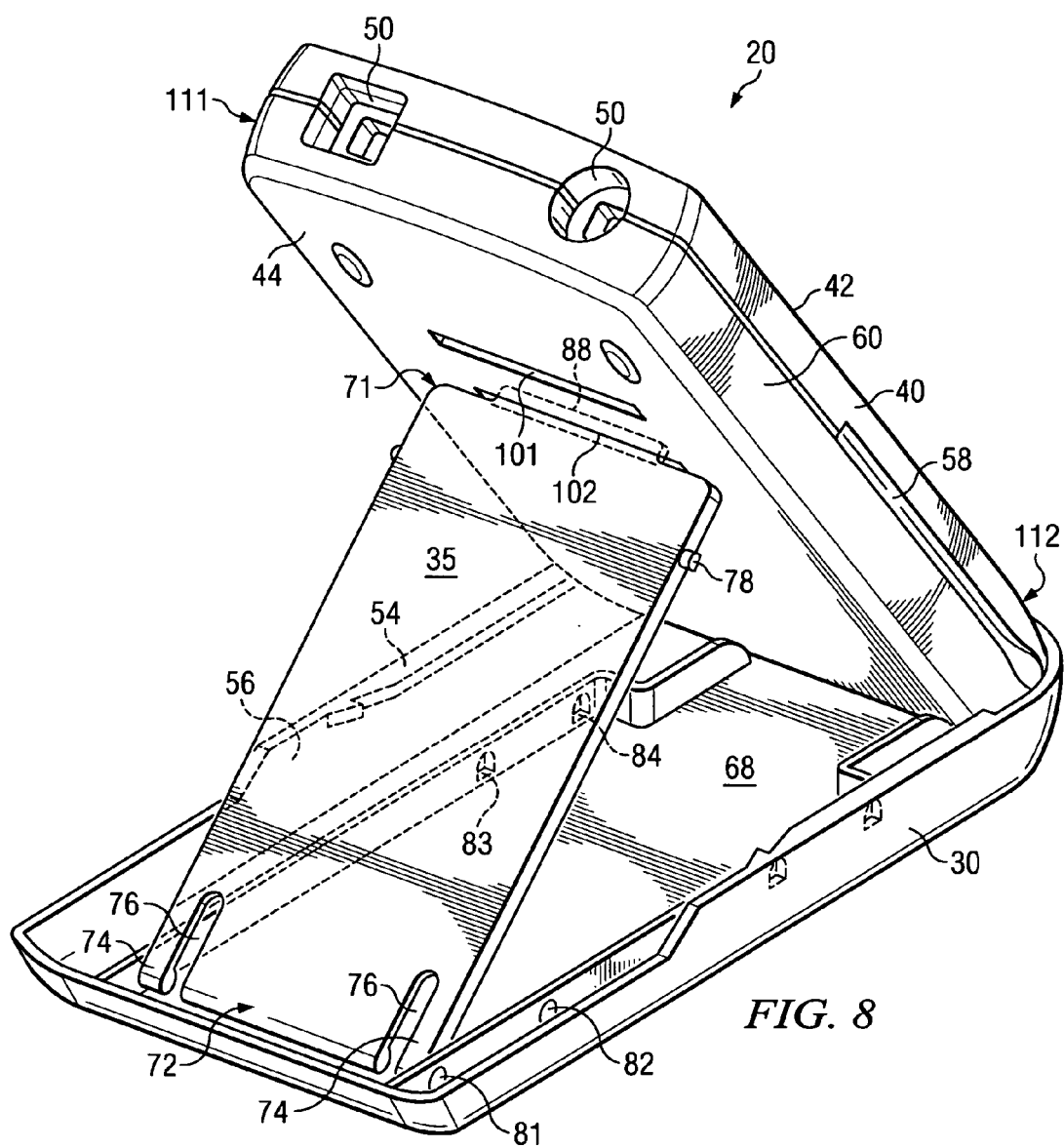
Figure 9:
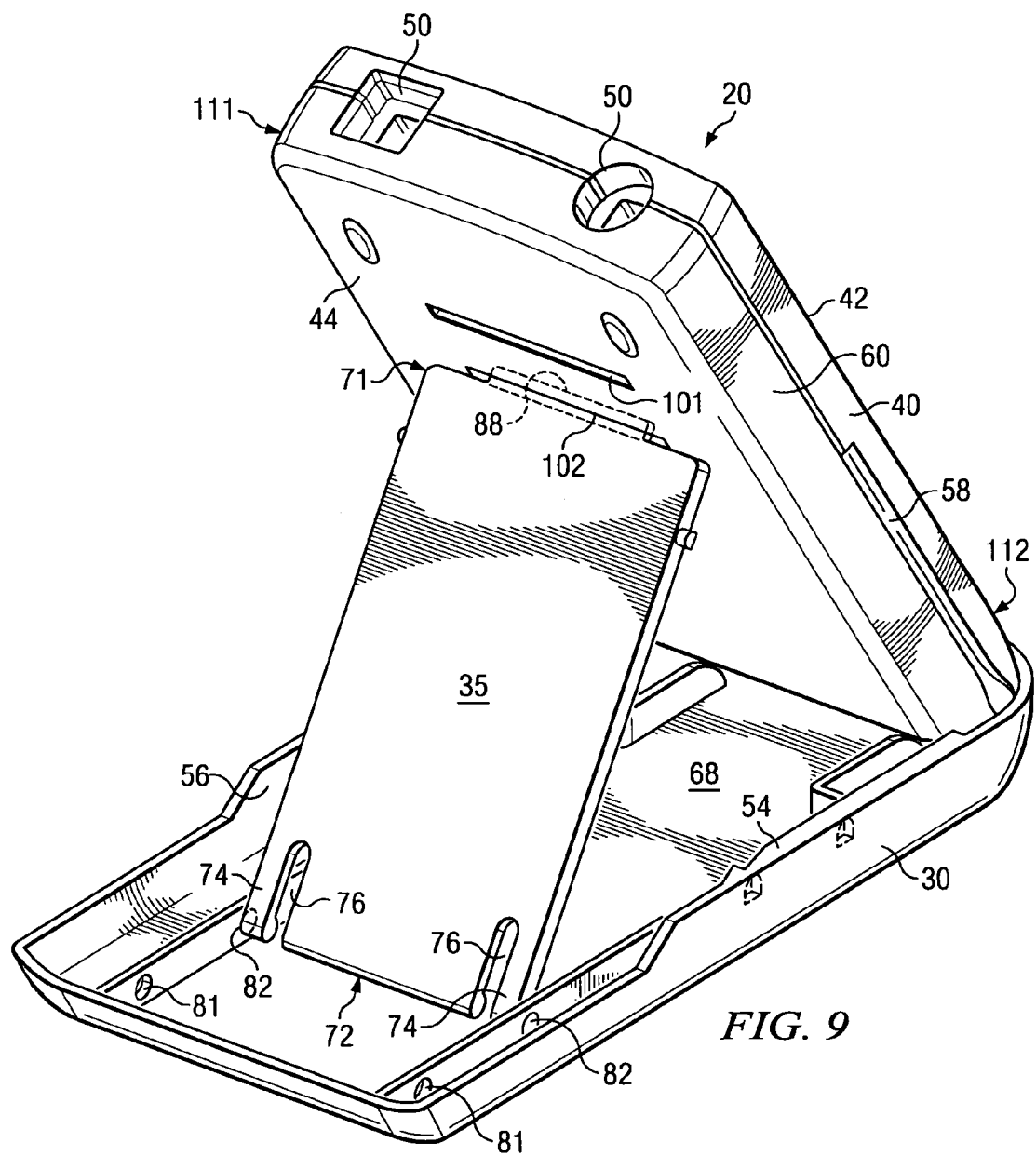
Figure 10:
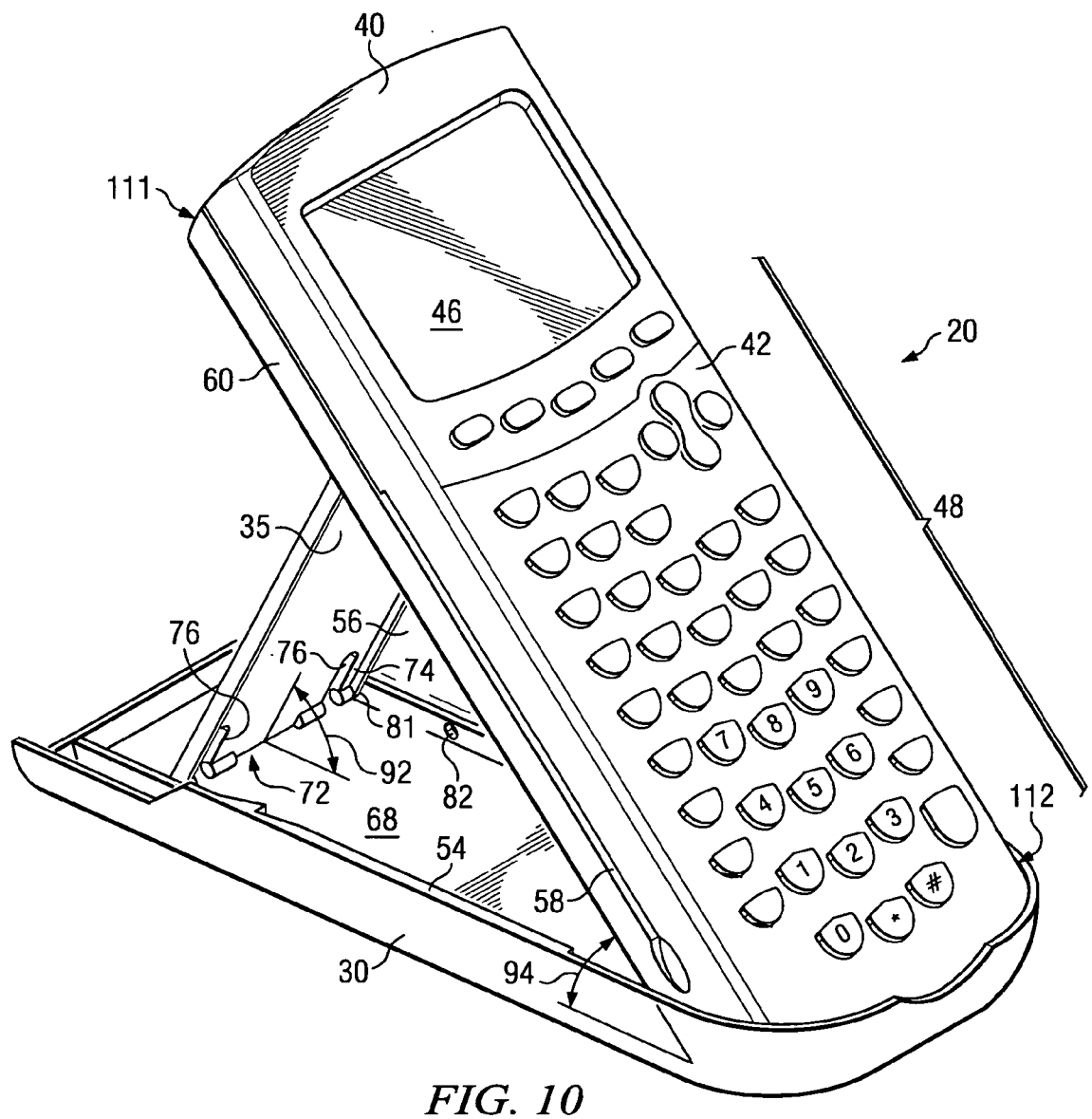
Figure 11:
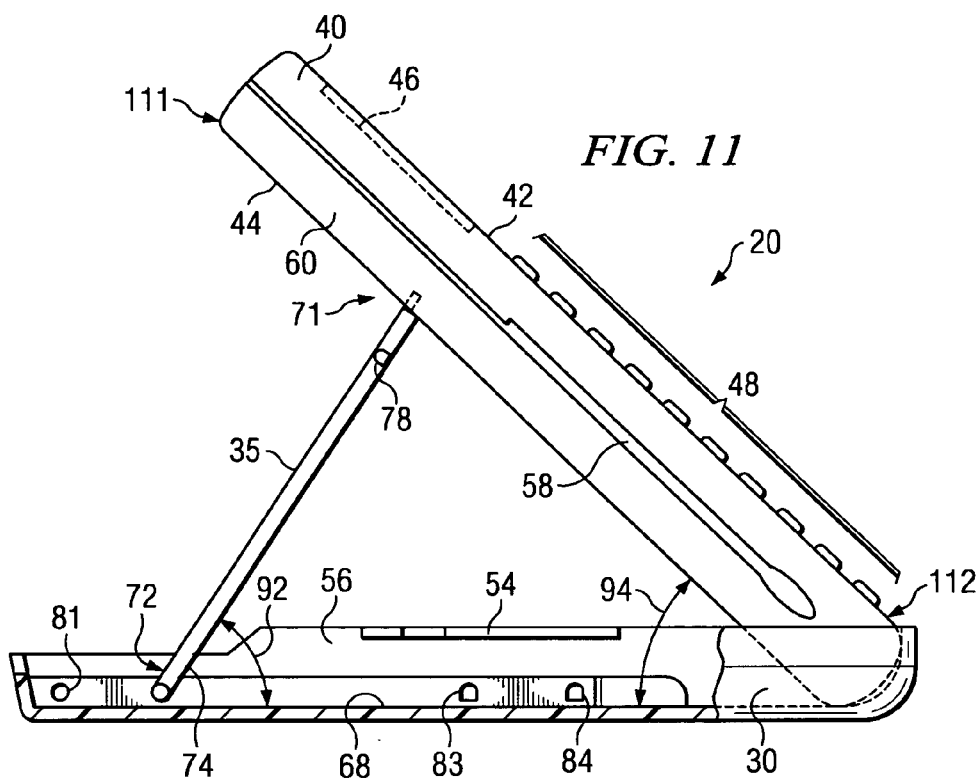
Figure 12:
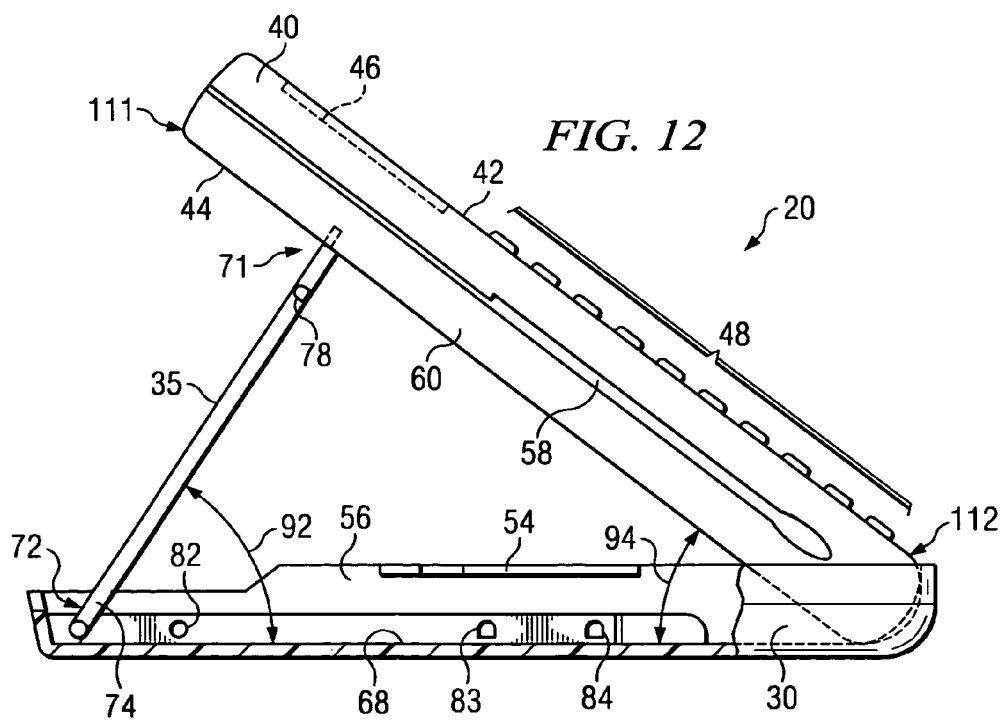

FIGS. 7–12 show variations of a tilted usage configuration for the system 20 of the first embodiment. FIGS. 7–9 are rear perspective views of the system 20 of the first embodiment, which show the bottom side 44 of the main housing 40. FIG. 10 is a front perspective view of the first embodiment to illustrate the enhanced viewing angle provided by a tilted usage configuration of the system 20. FIGS. 11 and 12 are side views of the system 20 of the first embodiment to illustrate various positions of the stand member 35 and to illustrate the tilt angle 94.

As shown in FIGS. 7 and 8, the main housing 40 of the first embodiment has two slots 101, 102 formed on the bottom side 44 of the main housing 40. These slots 101, 102 are designed to accept the tongue member 88 therein (or the distal end 71 of the stand member 35 therein if tongue member 88 is omitted). In a tilted usage configuration, the bottom side 44 of the main housing 40 (at a first end 111 of the main housing 40) rests on the distal end 71 of the stand member 35. The bowl shape of the case 30 retains a second end 112 of the main housing 40. The main housing 40 is thereby retained at a tilt angle 94 relative to a surface by the stand member 35 and the case 30 when the case 30 is laying on the surface. In other words, rather than having the main housing 40 flat relative to a surface (i.e., in a laying usage configuration), the main housing 40 (and the display screen 46) are tilted relative to the surface. This may make the display screen 46 easier to read while using the system 20. Also, a tilted usage configuration may make the system 20 more comfortable to use than a laying usage configuration. For example, if a user is using an external keyboard, keypad, mouse, or other device with one or two hands, a tilted usage configuration of the system 20 may allow the user to read the display screen 46 without having to use one of his/her hands to pick up the device 20. Also, because the stand member 35 is an integrated part of the device's case 30, a separate dedicated cradle for providing a tilted usage configuration is not needed. Thus, in a storage configuration, the stand member 35 is conveniently stored with the case 30 and less likely to be lost or separated from the remainder of the system 20. Furthermore, with the first embodiment of the present invention, a user is provided with a choice of having a laying or tilted configuration during use of the system 20.

Referring to FIGS. 7 and 8, the two slots 101, 102 in the bottom side 44 of the main housing 40 provide two alternative placements for the stand member 35, which will vary the tilt angle 94. In FIG. 7, the stand member 35 is shown in a first slot 101. In FIG. 8, the stand member 35 is shown in a second slot 102. Using the second slot 102 provides a larger tilt angle 94 than using the first slot 101.

In FIGS. 9–11, the tab members 74 of the stand member 35 are located in the second set of holes 82, and the tongue member 88 is located in the second slot 102. In FIG. 12, the tab members 74 of the stand member 35 are located in the first set of holes 81, and the tongue member 74 is located in the first slot 101. Hence, the first embodiment has four alternative configurations for forming a tilted usage configuration.

Although two slots 101, 102 are shown in the first embodiment, other embodiments (not shown) may have any number (one–many) of slots at other locations. Also, an embodiment may omit the use of any slots. In other embodiments (not shown), the system 20 may be adapted to have more or less alternative configurations for forming a tilted usage configuration. For example, an embodiment may have only one possible tilted usage configuration, whereas other embodiments may have two, three, four, or any number of alternatives for a tilted usage configuration.

Although the first embodiment is adapted to have a storage configuration, a laying usage configuration, and a tilted usage configuration, as described above, by the design of the system 20, other embodiments (not shown) may have fewer configurations possible. For example, the case 30 and the main housing 40 may be designed so that the system 20 has a storage configuration (case 30 covering at least part of the top side 42 of the main housing 40) and a tilted usage configuration while using the case 30 and stand member 35, but not a laying usage configuration while using the case 30 (i.e., the case 30 does not fit on the main housing 40 to cover at least part of the bottom side 44 of the main housing 40). In such case, the device may be used in a laying position only without the case 30 attached thereto, for example. As another example, the case 30 and the main housing 40 may be designed so that the system 20 has a laying usage configuration and a tilted usage configuration while using the case 30 and/or the stand member 35, but not a storage configuration.

In the first embodiment, the case 30, the stand member 35, and the main housing 40 are made from plastic, which is preferred. In other embodiments, however, the case 30, the stand member 35, and the main housing 40 may be made from any of variety of suitable materials, including (but not limited to): plastic, acrylic, latex, rubber, nylon, polypropylene, polyvinylchloride, polystyrene, glass, wood, metal, carbon fiber composite, fiberglass composite, composites thereof, compounds thereof, and combinations thereof, for example. Also, the case 30, the stand member 35, and the main housing 40 may be made from different materials than each other. These and other variations upon embodiments of the present invention will be apparent to one of ordinary skill in the art having the benefit of this disclosure.

An embodiment of the present invention may have or provide other advantages, in alternative to or in addition to others described above, including (but not necessarily limited to) any combination of the following:

Reducing glare on the display screen in a typical classroom or office environment;

Allowing for use of a keyboard without a separate, dedicated cradle;

Encouraging better posture for a user during use of the handheld computing device;

Providing more options for usage configurations than prior handheld computing devices;

With an adjustable and removable stand member option, allowing a user to remove the stand member from one location in the case and reinsert it into another location to effectively double, triple, or quadruple the number of view angles (i.e., tilt angle) the user can achieve;

Providing a multi-functional case; and

Enhancing the ergonomics of a handheld computing device.

Other variations and advantages may be apparent to one of ordinary skill in the art having the benefit of this disclosure.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A handheld computing device comprising:
   a display screen;
   a main housing portion that retains the display screen;
   a removable case adapted to slidably fit over at least part of the main housing portion;
   a stand member pivotably coupled to the case, wherein the stand member, the case, and the main housing portion are configured so that the main housing portion may be retained at a tilt angle relative to a surface by the stand member and the case when the case is laying on the surface and when the stand member is pivoted relative to the case to form a stand angle between the stand member and the case.

2. The handheld computing device of claim 1, wherein the stand member is removably coupled to the case.

3. The handheld computing device of claim 2, wherein the case has at least two stand attachment locations such that the stand member may be pivotable coupled to the case at any of the stand attachment locations.

4. The handheld computing device of claim 1, wherein the main housing portion comprises at least one slot adapted to accept a portion of the stand member therein and located on a back side of the main housing portion.

5. The handheld computing device of claim 1, wherein the handheld computing device is a graphing calculator.

6. The handheld computing device of claim 1, wherein the handheld computing device is adapted to have a storage configuration, such that in the storage configuration,
- the case is slidably attached to the main housing portion to cover at least part of the display screen and a top side of the main housing portion,
- the stand member is in a pivoted closed position relative to the case, and
- the stand member is located between the case and the top side of the main housing portion.

7. The handheld computing device of claim 1, wherein the handheld computing device is adapted to have a laying usage configuration, such that in the laying usage configuration,
- the case is slidably attached to the main housing portion to cover at least part of a bottom side of the main housing portion,
- the stand member is in a pivoted closed position relative to the case, and
- the stand member is located between the case and the bottom side of the main housing portion.

8. The handheld computing device of claim 1, wherein the main housing portion further retains a keypad, retains a processor therein, and is adapted to retain batteries therein.

9. The handheld computing device of claim 1, wherein the case and the stand member are made from plastic.

10. A handheld computing device system adapted to have a storage configuration, a laying usage configuration, and a tilted usage configuration, the system comprising:
- a display screen;
- a main housing portion having a top side and a bottom side, wherein the main housing portion retains the display screen on the top side;
- a removable case adapted to slidably attach to the main housing portion;
- a stand member having a distal end and an attachment end, the attachment end of the stand member being pivotably coupled to the case;
- such that in the storage configuration,
  - the case is slidably attached to the main housing portion to cover at least part of the top side of the main housing portion,
  - the stand member is in a pivoted closed position relative to the case, and
  - the stand member is located between the case and the top side of the main housing portion;
- such that in the laying usage configuration,
  - the case is slidably attached to the main housing portion to cover at least part of the bottom side of the main housing portion,
  - the stand member is in a pivoted closed position relative to the case, and
  - the stand member is located between the case and the bottom side of the main housing portion; and
- such that in the tilted usage configuration,
  - the stand member is in a pivoted open position relative to the case so that a stand angle is formed between the stand member and the case,
  - the bottom side of the main housing portion rests on the distal end of the stand member, and
  - the main housing portion is retained at a tilt angle relative to a surface by the stand member and the case when the case is laying on the surface.

11. The system of claim 10, wherein the stand member is removably coupled to the case.

12. The system of claim 11, wherein the case has at least two stand attachment locations such that the stand member may be pivotable coupled to the case at any of the stand attachment locations.

13. The system of claim 10, wherein the main housing portion comprises at least one slot adapted to accept at least part of the distal end of the stand member therein in the titled usage configuration and located on the bottom side of the main housing portion.

14. The system of claim 10, wherein the system is adapted for use as a graphing calculator.

15. A handheld computing device system adapted to have a tilted usage configuration, the system comprising:
- a display screen;
- a main housing portion having a top side and a bottom side, wherein the main housing portion retains the display screen on the top side;
- a removable case adapted to slidably attach to the main housing portion;
- a stand member having a distal end and an attachment end, the attachment end of the stand member being pivotably coupled to the case; and
- such that in the tilted usage configuration,
  - the stand member is in a pivoted open position relative to the case so that a stand angle is formed between the stand member and the case,
  - the bottom side of the main housing portion rests on the distal end of the stand member, and
  - the main housing portion is retained at a tilt angle relative to a surface by the stand member and the case when the case is laying on the surface.

16. The system of claim 15, wherein the system is adapted to have a storage configuration, such that in the storage configuration,
- the case is slidably attached to the main housing portion to cover at least part of the top side of the main housing portion,
- the stand member is in a pivoted closed position relative to the case, and
- the stand member is located between the case and the top side of the main housing portion.

17. The system of claim 15, wherein the system is adapted to have a laying usage configuration, such that in the laying usage configuration,
- the case is slidably attached to the main housing portion to cover at least part of the bottom side of the main housing portion,
- the stand member is in a pivoted closed position relative to the case, and
- the stand member is located between the case and the bottom side of the main housing portion.

18. The system of claim 15, wherein the stand member is removably coupled to the case.

19. The system of claim 18, wherein the case has at least two stand attachment locations such that the stand member may be pivotable coupled to the case at any of the stand attachment locations.

20. The system of claim 15, wherein the main housing portion comprises at least one slot adapted to accept at least part of the distal end of the stand member therein in the titled usage configuration and located on the bottom side of the main housing portion.

* * * * *